Nov. 14, 1961  F. B. HUNTER  3,008,482
SHUTTLE VALVE
Filed Oct. 29, 1957
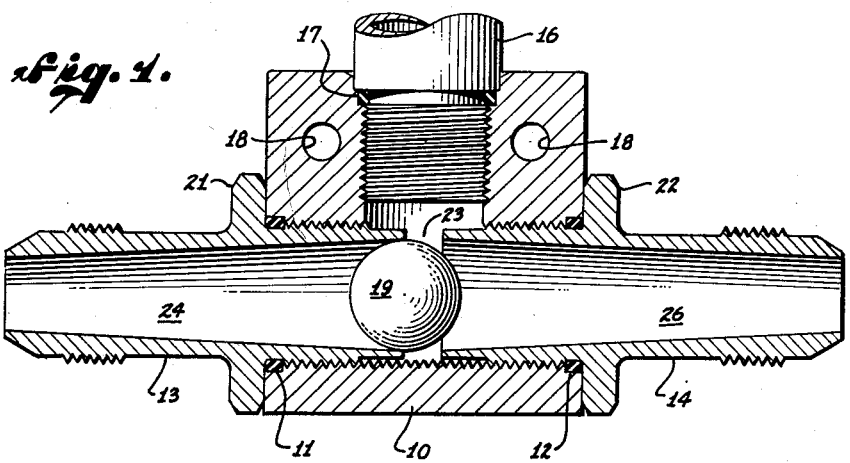
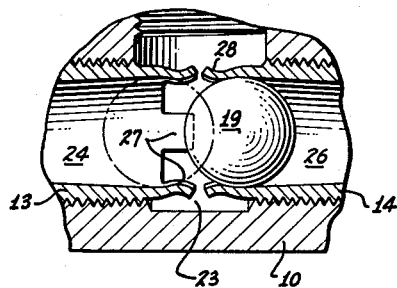
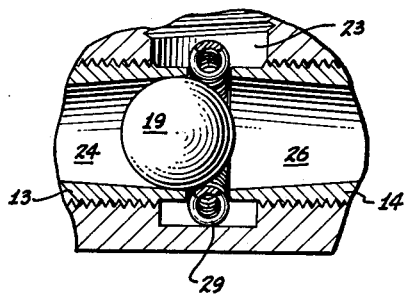
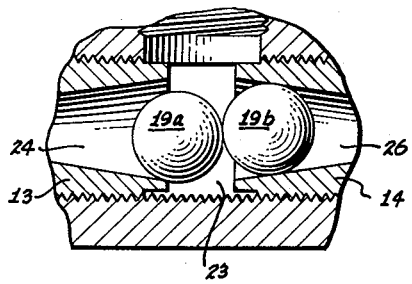
FRANK B. HUNTER,
INVENTOR.
HERZIG & JESSUP,
ATTORNEYS.
BY United States Patent Office 3,008,482
Patented Nov. 14, 1961

3,008,482
SHUTTLE VALVE
Frank B. Hunter, 5667 Lubao St., Woodland Hills, Van Nuys, Calif.
Filed Oct. 29, 1957, Ser. No. 693,081
1 Claim. (Cl. 137—113)

The present invention relates to a shuttle valve, and particularly to a ball shuttle valve.

In fluid systems, such as hydraulic systems, an efficient shuttle valve frequently is found useful. Such shuttle valves should require a minimum of pressure to shuttle them after being subjected to high system pressures, the shuttle should not leak immediately after being actuated and there should be minimum passage of fluid during the actual shuttling. These requirements are relatively difficult to meet in actual practice.

Accordingly, it is an important object of my invention to provide a shuttle valve that does not leak and requires a minimum of actuating pressure and fluid passage in actual service.

Another object is to provide a shuttle valve that is efficient and reliable in hydraulic systems.

Additional objects will become apparent from the following description.

Broadly stated, the shuttle valve of my invention comprises a valve body having two tapered fluid passages formed therein of gradually increasing diameter inwardly of the body, a third fluid passage formed in the body and communicating with the other two, and a ball disposed in one, or each, of the tapered passages for seating and unseating in the passage while fluid tends to flow inwardly or outwardly of the passage.

A more detailed description of the invention is given with reference to the drawing, wherein:

FIGURE 1 is a cross-sectional elevational view of a shuttle valve showing a ball seated at the inner end of one of the tapered fluid passages;

FIGURE 2 is a partial cross-sectional elevational view showing another embodiment of the valve wherein the inner ends of the tapered passages are provided with resilient fingers;

FIGURE 3 is a similar view showing a further embodiment wherein a helical spring in the shape of a doughnut is positioned between the inner ends of the tapered passages; and FIGURE 4 is a similar view showing an additional embodiment wherein a ball is disposed in each of the tapered passages.

The specific embodiment shown in FIGURE 1 can be constructed as follows. A body block 10 is provided with a drilled through hole counterbored at both ends in two sides of the block to accommodate O-rings 11 and 12, and tapped to threadedly mesh with the inner ends of inserted unions 13 and 14, as shown. A joining hole is drilled from a third side of the block 10 into a side of the through hole to form a T-shaped passage in the block. The joining hole also is tapped to threadedly engage the threads of pipe 16 and is countersunk and counterbored to receive O-ring 17. Two mounting holes 18 can be drilled transversely through the block 10 to receive bolts, for example, for attaching the valve assembly to a support, if desired.

Unions 13 and 14 are threaded at their outer ends for connection into hydraulic circuits, and at their inner ends for insertion in block 10, as described above, after a ball 19 first is inserted in the through hole and positioned between the inner ends of the unions. The unions are provided with shoulders 21 and 22 for precisely limiting the distance of their insertion into block 10 and for cooperating with the O-rings 11 and 12 to form tight connections. The lengths of the unions from the shoulders 21 and 22, respectively, to their inner ends are carefully determined in relation to the width of the block 10 and the diameter of the ball 19 so that a space 23 remains between the inner ends of the unions so that ball 19 can shuttle across this space and so that communication is established between the pipe 16 and the passages 24 and 26 through the unions 13 and 14, respectively.

The fluid passages 24 and 26, longitudinally through unions 13 and 14, respectively, taper gradually from their outer ends to their inner ends with increasing diameter toward their inner ends. The diameters of the passages 24 and 26 at their inner ends of the unions is substantially equal to the diameter of the ball 19 disposed between these inner ends for shuttling between the inner ends of the passages 24 and 26 and seating in one or the other thereof.

For example, a sufficient excess of fluid pressure in passage 26 over that in passage 24 will cause ball 19 to seat in the inner end of passage 24, as shown, closing the same against the flow of fluid therefrom, while fluid flows from passage 26 through space 23 and through pipe 16, or in the reverse direction from pipe 16, through passage 26. If the fluid pressure in passage 26 drops below that in passage 24, ball 19 will be forced to seat in the end of passage 26 and fluid from passage 24 will flow into space 23 and pipe 16.

The shuttle valve shown in FIGURE 1 can be used in a hydraulic system by connecting pipe 16 to a hydraulic cylinder or pump, union 14 to the hydraulic system and union 13 to an emergency hydraulic pressure source. Should the pressure in the pump or system fall below a predetermined pressure value in passage 26, ball 19 unseats from the inner end of passage 24 and hydraulic fluid from passage 24 enters the system through space 23 and boosts the pressure in the system to the desired predetermined value.

A shuttle valve of the type shown in FIGURE 1 was tested in a hydraulic system at pressures up to about 3000 pounds per square inch. The pressure required to shuttle the valve was found to be a constant, very low percent of the system pressure from about 1000 p.s.i. to about 3000 p.s.i., no leakage was found at any system pressure on seating of the shuttling member, and the discharge during the shuttling cycle was found to be only measureable in drops or fractions of a drop.

In the specific embodiment shown in FIGURE 2 the inner ends of the unions 13 and 14 are provided with resilient fingers 27 and 28, respectively. These fingers can be formed by longitudinally slotting the ends of the unions 13 and 14 to form the longitudinally projecting fingers 27 and 28 and then deforming the fingers inwardly as shown to resiliently hold the ball 19 and more positively and tightly seat the same underload on either end of the unions 13 and 14 in the seated position, as shown in solid and in phantom in FIGURE 2. Alternatively only one of the unions, either 13 or 14, can be so provided with finger 27 or 28 for tightly seating the ball, the inner end of the other union being made plain as described above.

The specific embodiment shown in FIGURE 3 contains a circular, or doughnut shaped, helical spring 29 disposed in space 23 between the inner ends of unions 13 and 14, concentric with the axes of the two unions. The ball 19 can be seated at the inner end of union 13, as shown, or at the inner end of union 14 by being forced through the spring 29. In other words, the ball 19 shuttles between the inner ends of the unions by passing through the resilient spring 29 which more positively and tightly seats the ball underload in the ends of the unions. The hydraulic fluid from the passages 24 and 26 passes through the spaces between the coils in the spring and into space 23.

In the specific embodiment shown in FIGURE 4, two balls 19a and 19b are employed. The space 23 at the inner ends of the unions 13 and 14 is designed so that one ball 19a remains disposed near the inner ends of passage 24 of union 13, and the other ball 19b remains disposed near the inner end of passage 26 through union 14. When hydraulic fluid discharges into space 23 from passage 24, ball 19a is unseated and ball 19b is seated, as shown, and when fluid discharges from the inner end of passage 26, ball 19b is unseated and ball 19a is seated.

The various parts of the above-described shuttle valve can be made of any suitable metallic or non-metallic materials capable of safely withstanding the fluid pressures, and the temperatures and chemical properties of the fluids and atmospheres with which and in which they are used. The ball 19, for example, can be made of steel, preferably hardened steel to polish the seats at the inner ends of the unions as the ball shuttles back and forth. It can, however, be made of such other materials as glass, hard rubber, or synthetic plastics. Similarly, the unions 13 and 14 and the body 10 can be made of steel, ferrous alloys, non-ferrous metals, or non-metallic materials such as glass, plastics, hard rubber and other compounded materials having high strength, temperature resistance and chemical inertness for special applications.

By way of example, conduit 16 (FIGURE 1) may be connected to a landing gear or to other apparatus intended to be operated by hydraulic pressure from the normal supply passage 26 and auxiliary supply passage 24, useable in the event of failure of the line communicating with passage 26. The supply through the line communicating with passage 24 comes into action upon pressure being exerted through passage 24 and against the ball 19 sufficient to unseat the ball from its normal position in the inner end of passage 24 and to seat it in the inner end of passage 26. In this position passage 26 is blocked and fluid from passage 24 is by-passed into the supply line 16.

The various means shown for retaining a predetermined pressure prior to unseating the ball from its auxiliary seating position, such as those shown in FIGURES 2 and 3, or for actuating the other ball as shown in FIGURE 4, are by way of illustration of various specific embodiments of my invention. In the embodiments shown in FIGURES 2 and 3, a sticking taper for the ball is not required. A detent, of spring actuated or other type, may be employed with the balls 19a and 19b shown in FIGURE 4 so as to retain them collectively in either one or the other extreme operative position, such as to the left or to the right of the embodiment shown.

The foregoing description is explanatory only, and is given primarily to illustrate specific embodiments of my invention. It is understood that many variations in the structure, design and details of the shuttle valve described above will occur to one skilled in the art. Accordingly, it is understood that such changes and modifications in the structure, design and details of the specific embodiments of my invention illustrated and described above may be made within the scope of the appended claim without departing from the spirit of the invention.

What I claim is:

A shuttle valve comprising a body having an internal chamber therein, axially aligned internally threaded openings through said body and communicating with said chamber, tubular conduits threaded into said openings and having stop means thereon engaging said body to hold the inner ends of said conduits axially spaced apart within said chamber, said conduits being provided with axially aligned internal passages of generally conical shape with their largest diameters at the inner spaced ends of said conduits, an annular tension spring in the space between the ends of said conduits, a ball in said passages and being of such diameter as to sealingly seat in a conical end of either conduit and project outwardly of the end thereof into engagement with the inner periphery of said spring while the latter bears against the end of the other conduit, the normal internal diameter of said spring being less than the diameter of said ball, and a further passageway extending through said body from said chamber to define an outlet for said valve.

References Cited in the file of this patent

UNITED STATES PATENTS

| | | |
|---|---|---|
| 172,934 | Prall | Feb. 1, 1876 |
| 315,521 | Lord et al. | Apr. 14, 1885 |
| 1,509,843 | Ricker | Sept. 30, 1924 |
| 1,938,369 | Beebe | Dec. 5, 1933 |
| 2,237,014 | Stoehrer | Apr. 1, 1941 |